Dec. 16, 1958 M. T. O'DWYER ET AL 2,864,889
TELEPHONE ANSWERING MACHINE
Filed Nov. 28, 1955
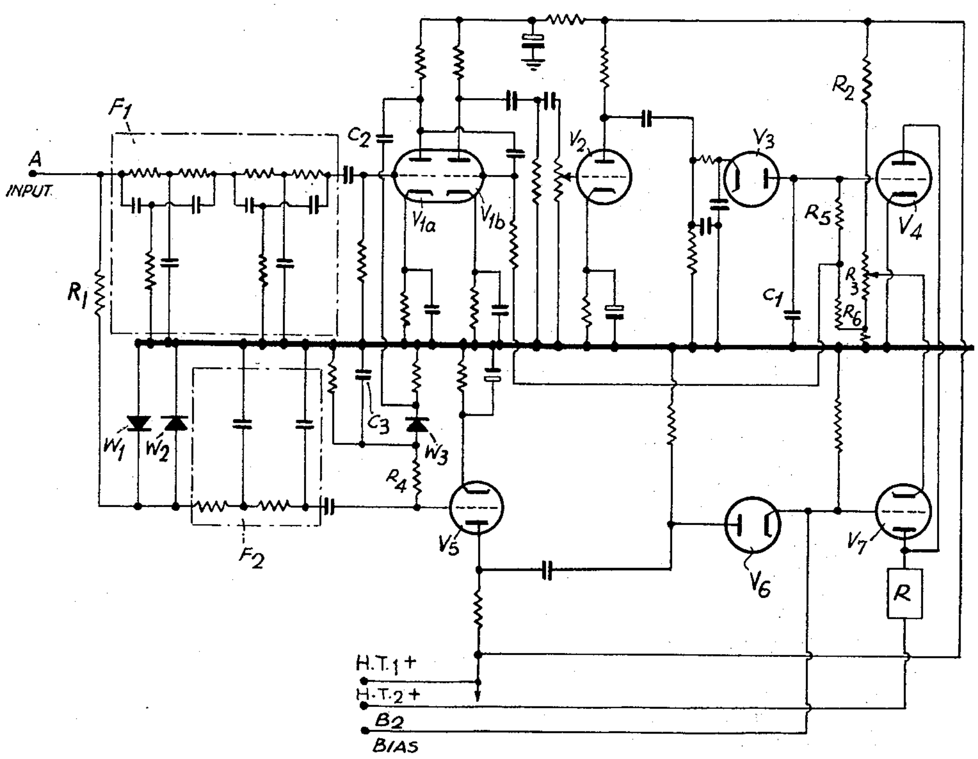
Inventor
Martin T. O'Dwyer
Hans Dill
By
Holcombe, Wetherill & Brisebois
Attorneys

United States Patent Office 2,864,889

Patented Dec. 16, 1958

2,864,889

TELEPHONE ANSWERING MACHINE

Martin T. O'Dwyer and Hans Dill, Cambridge, England, assignors to Pye Limited, Cambridge, England, a British company Application November 28, 1955, Serial No. 549,422

Claims priority, application Great Britain December 6, 1954

12 Claims. (Cl. 179—6)

The present invention relates to machines of the kind (hereinafter referred to as "the kind described") which are intended to answer the telephone automatically, for example in the absence of a subscriber, and which reproduce a recorded message to the caller and also invite the caller to record a message and provide the necessary recording facilities.

It is generally desirable, and in some cases a requirement of the telephone authorities, that the telephone answering machine shall not remain connected to the telephone line after the caller terminates his call, and more specifically that the telephone answering machine shall effectively disconnect itself from the telephone line upon the termination of a call received from either an automatic exchange, or a manual exchange or upon the termination of a trunk call. It is not generally sufficient that the telephone answering machine should merely incorporate a time-controlled mechanism which operates after a certain period, for example a few minutes to disconnect the machine from the telephone line, and it is necessary to arrange for the machine to clear the telephone line substantially immediately after a caller has rung off or terminated a call.

The object of the present invention is therefore to provide a telephone answering machine which will automatically become disconnected from the telephone line substantially immediately after the termination of a call and which will operate successfully on a call received from either an automatic telephone exchange or a manual telephone exchange or a trunk call.

According to the present invention, a telephone answering machine of the kind described includes a line monitoring circuit which is adapted to be connected to the speech circuit of the telephone line at least when a caller is recording a message and which comprises two parallel channels, one of said channels detecting the presence of a dialling tone and producing an output in response to the detected dialling tone to operate a relay or the like, and the other of said channels detecting speech frequencies and being arranged to operate said relay or the like in the absence of said speech frequencies, the operation of said relay or the like switching off the telephone answering machine or otherwise effectively disconnecting it from the telephone line.

The signal channel which detects the presence of the dialling tone may comprise a filter designed to pass substantially only dialling tone frequencies and switch means operated by an output signal from the filter which actuate a relay. Similarly the channel which detects speech frequencies may comprise a filter designed to pass speech frequencies but substantially reject the dialling tone frequencies, for example a high pass filter, and switch means operated in the absence of an output signal from this filter to actuate the relay.

Each channel preferably also comprises an electronic valve amplifier for amplifying the output signal from the associated filter and a detector whose output controls the switch means which itself may constitute an electronic valve.

Different methods are employed by the General Post Office for generating the dialling tone in different telephone exchanges and the filter circuit in the channel which detects the presence of a dialling tone is arranged to respond to the various different dialling tones and preferably includes a clipping circuit to clip the dialling tone signal received to a substantially constant amplitude and to remove or reduce high frequency components present on certain dialling tone waveforms.

In practice it is difficult to design a filter which completely discriminates between dialling tone and speech frequencies, since as mentioned above, the dialling tone may take various forms and is generally a non-sinusoidal waveform which contains harmonics included within the speech frequency range. It is also possible that when a caller is speaking, some of the speech frequencies received may pass through the dialling tone filter and thus operate the switch means controlling the relay to switch off the telephone answering machine. In order to prevent this, according to a feature of the invention, a portion of the speech frequency received from the caller is applied as a bias to prevent the operation of the dialling tone channel whilst a caller is speaking.

According to a further feature of the invention, the line monitoring circuit only becomes operative when the telephone answering machine is ready to record the caller's message. To this end the high tension supply to the line monitor circuit may only be connected at this time. Alternatively the high tension supply to at least a part of the line monitor circuit may be previously connected and a bias signal applied to the switch means in the channel responsive to speech frequencies during the periods when the telephone answering machine is operating to answer the caller and inviting him to dictate a message. This bias signal serves to prevent the switch means actuating the relay to switch off the telephone answering machine. When the machine has invited the caller to dictate a message the bias signal is removed, preferably after a short time lag, in order to allow for hesitation on the part of the caller after the invitation to speak and before commencing to dictate a message.

According to another feature of the invention a bias signal may also be fed to the dialling tone channel of the line monitor circuit during part of the period whilst the machine is operating in order to prevent spurious signals, for example received over the telephone line or produced by switching operations in the telephone answering machine, from operating the relay to switch off the machine.

In order that the invention may be more fully understood, reference will now be made to the accompanying drawing which shows a circuit diagram of a line monitor circuit according to the present invention.

Referring to the drawing, the input terminal A of the line monitor circuit to which the telephone line is connected, is joined through a high-pass filter enclosed with the broken-line rectangle F1 to the grid of a triode amplifier valve V1A. The filter circuit F1 comprises two T-section filters connected in series to form the speech-frequency filter which substantially cuts off below 300 C./S. The signals amplified by valve V1A are fed through amplifier valves V1B and V2 to the cathode of the diode rectifier V3. The rectified output from valve V3 is fed to condenser C1 connected across the grid of valve V4 to provide a negative bias on the grid of valve V4. The anode of valve V4 is connected through the operating coil R of a relay to the positive high tension supply line H. T. 2.

Input terminal A is also connected through a resistor R1 and clipping rectifiers W1 and W2 to a low-pass filter enclosed within the broken-line rectangle F2. The filter F2 is designed to pass dialling tone frequencies and certain harmonics thereof and the output of this filter is applied to the grid of a triode amplifier valve V5. The output from valve V5 is applied to the anode of rectifier V6 and the output from this rectifier is fed to the grid of valve V7. The cathode of valve V7 is connected to a tapping point on resistor R3 forming part of a resistor chain comprising resistors R2 and R3 connected across the high tension supply H. T. 1. Thus a positive bias is applied to the cathode of valve V7 which is thereby normally cut off. The anode of valve V7 is connected in parallel with the anode of valve V4 through the relay coil R to the positive high tension supply line H. T. 2. A bias may also be applied from the terminal B2 to the grid of valve V7.

The anode of valve V1A is also connected through condenser C2 to rectifier W3 which produces a rectified negative voltage from the signal at the anode of V1A across condenser C3 and this is applied to the grid of valve V5 through resistor R4. The high tension supply H. T. 1 feeds valves V1A, V1B, V2 and V5 and the high tension supply H. T. 2 feeds valves V4 and V7.

The operation of the circuit will now be explained. Let it be assumed that the telephone answering machine is switched on and a message recorded informing a caller that the called subscriber is not available, and inviting the caller to record a message. Upon receipt of ringing current, the machine is automatically connected to the speech circuit of the telephone lines and reproduces the recorded message and the invitation to record a message to the caller. Towards the end of this period, high tension circuit H. T. 1 is switched on and in order to prevent relay R being energized to switch off the answering machine when high tension circuit H. T. 2 is completed, due to valve V4 conducting, the speech signal voltage of the end of the recorded message from the answering apparatus is connected to terminal A. The rectified signal thus obtained at the anode of valve V3 charges condenser C1 negatively and this voltage is applied to the grid of valve V4 so that the valve remains cut-off. As mentioned previously valve V7 is normally cut-off by the cathode bias provided from resistor R3 and therefore no current will pass through the coil of relay R which remains inoperative.

When the telephone answering machine has invited the caller to record a message and the appropriate recording device is brought into operation, high tension supply H. T. 2 is completed, but by reason of the bias present on the valves V4 and V7, no current flows through relay R. At the same time however the answering unit is switched off, and if after a delay produced by the discharge time constant of condenser C1 and resistor R5 and R6 the caller has not commenced to dictate a message, the bias on valve V4 would be removed which would conduct and thus energize the coil of relay R to switch off the telephone answering machine. The delay provided by the discharge of C1 allows a reasonable period e. g. 5 seconds for the caller to hesitate before dictating his message.

Since speech voltages from the answering unit are used to hold off the operation of relay R for a short period until the caller begins to speak, the absence of such signals, due for example to a fault in the answering unit, can be used to render the machine inoperative until such a fault is cleared.

In addition, when H. T. is applied to valves V4 and V7 a negative voltage is applied to the grid of valve V7 through terminal B2 for a few seconds in order to prevent the valve from conducting on spurious signals produced by switching operations in the machine. Assuming however that the caller dictates a message when invited to do so, the speech signals fed through filter F1 and amplifiers V1A, V1B and V2 are detected by valve V3, will maintain the negative charge across condenser C1 so that valve V4 remains cut-off and relay R inoperative. When the caller replaces his telephone receiver, the negative voltage at the grid of valve V4 decreases due to the discharge of condenser C1, hence this valve conducts and relay R operates to switch off the telephone answering machine. This is the operation of the machine when connected to a manual exchange or on the termination of a trunk call when after the caller has replaced his receiver the links between the exchanges involved may not be immediately broken and no dialling tone is received.

Whilst the caller is speaking, a portion of the speech signal appearing at the anode of valve V1A is rectified by the rectifier W3 to produce a negative voltage across condenser C3 which is applied as a bias to the grid of valve V5 through resistor R4 to ensure that V5 is cut-off. This bias is necessary since it is not possible completely to separate the dialling tone harmonics from speech frequencies and hence a certain amount of speech current passes through rectifiers W1 and W2 and the low pass filter F2 to the grid of valve V5 and may be sufficient in the case of very strong speech signals, when amplified by valve V5 and rectified by valve V6, to overcome the bias of valve V7 causing the latter valve to conduct and so energise relay coil R, thus switching off the telephone answering machine and cutting off the caller while he is speaking.

On automatic exchanges when the caller hangs up his receiver, dialling tone is fed through rectifiers W1, W2 and low pass filter F2 to the grid of valve V5. This valve can now amplify the dialling tone since the bias produced across condenser C3 has been removed with the termination of the speech signals. The amplified signal from valve V5 is rectified by valve V6 and overcomes the positive cathode bias of valve V7 causing this valve to conduct and thereby energize the coil of relay R which operates to switch off the telephone answering machine.

The time allowed to a caller to dictate a message may be limited by means of a time controlled mechanism which, if the caller is still talking at the end of the allowed time, e. g. 3 minutes, overcomes the action of the line monitoring circuit and switches off the telephone answering machine. This time controlled switching arrangement which may be constructed as described in application No. 549,526, filed November 28, 1955, in the name of Martin Thomas O'Dwyer, also ensures that the telephone answering machine is switched off in the event of a fault developing in the line monitoring circuit so that in any event the machine does not remain switched on to the telephone lines.

Whilst a particular embodiment has been described it will be understood that various modifications may be made without departing from the scope of this invention. For example, if desired the bias voltage for valve V4 may be obtained from a source other than the answering unit, such as from the mains supply feeding the line monitor circuit.

We claim:

1. In a telephone answering machine of the kind described, a line monitoring circuit which is adapted to be connected to the speech circuit of the telephone line at least when a caller is recording a message and which comprises two parallel channels, the first of said channels including means for detecting the presence of a dialing tone and means for producing an output in response to the detected dialling tone, relay means operable by the output of said first channel, and the second of said channels including means for detecting speech frequencies and means arranged to operate said relay means in the absence of said speech frequencies, said relay means operating effectively to disconnect the telephone answering machine from the speech circuit of the telephone line.

2. A machine as claimed in claim 1, in which the first channel which detects the presence of the dialling tone comprises a filter designed to pass substantially only dialling tone frequencies and switch means operated by an output signal from the filter which actuates said relay means.

3. A machine as claimed in claim 2, in which the filter which detects the presence of dialling tone includes a clipping circuit to clip the dialling tone signal received to a substantially constant amplitude and substantially to reduce high frequencies in the dialling tone waveform.

4. A machine as claimed in claim 1, in which the second channel which detects speech frequencies comprises a filter designed to pass speech frequencies but substantially reject dialling tone frequencies, and switch means operated in the absence of an output signal from the filter to actuate said relay means.

5. A machine as claimed in claim 4, in which the filter is a high-pass filter.

6. In a telephone answering machine of the kind described, a line monitoring circuit which is adapted to be connected to the speech circuit of the telephone line at least when a caller is recording a message, said line monitoring circuit comprising two parallel channels, the first of said channels including a filter for detecting the presence of a dialling tone, an amplifier for amplifying the output of said filter and a rectifier for producing an output from said amplifier in response to the detection of a dialling tone, relay means operable by the output of said first channel, the second of said channels including a filter for detecting speech frequencies, an amplifier for amplifying the output of said filter and a rectifier producing an output in response to said speech frequencies and means arranged to operate said relay means in the absence of an output from said rectifier of speech frequencies, said relay means operating effectively to disconnect the telephone answering machine from the speech circuit of the telephone line.

7. In a telephone answering machine of the kind described, a line monitoring circuit which is adapted to be connected to the speech circuit of the telephone line at least when a caller is recording a message, said line monitoring circuit comprising two parallel channels, the first of said channels including means for detecting the presence of a dialling tone, means for producing an output in response to the detection of a dialling tone and first switch means operated on the detection of dialling tone, relay means operable by said first switch means, the second of said channels including means for detecting speech frequencies and second switch means arranged to operate said relay means in the absence of said speech frequencies, said relay means operating effectively to disconnect the telephone answering machine from the speech circuit of the telephone line.

8. A machine as claimed in claim 7, in which said first and second switch means comprise electronic valves.

9. In a telephone answering machine of the kind described, a line monitoring circuit which is adapted to be connected to the speech circuit of the telephone line at least when a caller is recording a message, said line monitoring circuit comprising two parallel channels, the first of said channels including means for detecting the presence of a dialling tone and means for producing an output in response to the detection of a dialling tone, relay means operable by the output of said first channel, the second of said channels including means for detecting speech frequencies and means arranged to operate said relay means in the absence of said speech frequencies, said relay means operating effectively to disconnect the telephone answering machine from the speech circuit of the telephone line and means for applying a portion of the speech frequency signals as a bias to the first of said channels whilst the speech frequencies are present, to render said first channel inoperative.

10. In a telephone answering machine of the kind described, a line monitoring circuit which is adapted to be connected to the speech circuit of the telephone line at least when a caller is recording a message, said line monitoring circuit comprising two parallel channels, the first of said channels including means for detecting the presence of a dialling tone and means for producing an output in response to the detection of a dialing tone, relay means operable by the output of said first channel, the second of said channels including means for detecting speech frequencies and means arranged to operate said relay means in the absence of said speech frequencies, said relay means operating effectively to disconnect the telephone answering machine from the speech circuit of the telephone line and means for applying a bias signal to the second of said channels during the period when the telephone answering machine is operating to answer a caller and inviting him to dictate a message.

11. In a telephone answering machine of the kind described a line monitoring circuit which is adapted to be connected to the speech circuit of the telephone line at least when a caller is recording a message, said line monitoring circuit comprising two parallel channels, the first of said channels including means for detecting the presence of a dialling tone and means for producing an output in response to the detection of a dialling tone, relay means operable by the output of said first channel, the second of said channels including means for detecting speech frequencies and means arranged to operate said relay means in the absence of said speech frequencies, said relay means operating effectively to disconnect the telephone answering machine from the speech circuit of the telephone line and means for applying a bias signal to the first of said channels during part of the period of operation of the machine in order to prevent spurious signals other than dialling tone from operating the relay means to switch off the machine.

12. In a telephone answering machine of the kind described, a line monitoring circuit which is adapted to be connected to the speech circuit of the telephone line at least when a caller is recording a message, said line monitoring circuit comprising two parallel channels, the first of said channels including a first filter designed to pass substantially only dialling tone frequencies and first switch means operated by an output from said first filter, relay means operable by said first switch means, the second of said channels including a filter designed to pass speech frequencies but substantially reject dialling tone frequencies and second switch means arranged to operate said relay means in the absence of said speech frequencies, said relay means operating effectively to disconnect the telephone answering machine from the speech circuit telephone line.

No references cited.